(12) United States Patent
Liao et al.

(10) Patent No.: US 11,316,405 B2
(45) Date of Patent: Apr. 26, 2022

(54) HUMAN MOTION ENERGY HARVESTING APPARATUS AND CONVERSION METHOD THEREOF

(71) Applicant: The Chinese University of Hong Kong, Hong Kong (CN)

(72) Inventors: Wei-Hsin Liao, Hong Kong (CN); Mingjing Cai, Zhanjiang (CN); Jiahua Wang, Xuancheng (CN)

(73) Assignee: The Chinese University of Hong Kong, Hong Kong (CN)

( * ) Notice: Subject to any disclaimer, the term of this patent is extended or adjusted under 35 U.S.C. 154(b) by 408 days.

(21) Appl. No.: 16/560,350

(22) Filed: Sep. 4, 2019

(65) Prior Publication Data

US 2020/0251962 A1    Aug. 6, 2020

(30) Foreign Application Priority Data

Feb. 1, 2019  (CN) ......................... 201910104425.X

(51) Int. Cl.
  *H02K 7/18*    (2006.01)
  *G04C 10/00*   (2006.01)
(52) U.S. Cl.
  CPC ......... *H02K 7/1861* (2013.01); *H02K 7/1853* (2013.01); *G04C 10/00* (2013.01)
(58) Field of Classification Search
  CPC .... H02K 7/1861; H02K 7/1853; G04C 10/00; G04C 21/00
  See application file for complete search history.

(56) References Cited

U.S. PATENT DOCUMENTS

| | | | |
|---|---|---|---|
| 6,531,798 B1 * | 3/2003 | Palmero | F16H 25/2018 |
| | | | 310/112 |
| 7,088,022 B2 * | 8/2006 | Yamaguchi | H02K 7/063 |
| | | | 310/268 |
| 9,093,870 B2 * | 7/2015 | Kanai | H02K 7/085 |

FOREIGN PATENT DOCUMENTS

| | | |
|---|---|---|
| CN | 101110524 | 1/2008 |
| CN | 102025289 | 4/2011 |

(Continued)

OTHER PUBLICATIONS

"Chinese Application Serial No. 201910104425.X, Office Action dated Jan. 26, 2022", w English Translation, (Jan. 26, 2022), 15 pgs.

*Primary Examiner* — Dang D Le
(74) *Attorney, Agent, or Firm* — Schwegman Lundberg & Woessner, P.A.

(57) ABSTRACT

A human motion energy harvesting apparatus embeddable in a wearable electronic device is provided. The apparatus may include a base; a first rotor disposed in a ring shape and connected to the base, the first rotor being rotatable circumferentially relative to the base, wherein a plurality of pairs of first permanent magnets may be disposed on a surface of the first rotor; an oscillating weight fixed coaxially with the first rotor; a second rotor disposed in a ring shape and coaxially connected to the base with the first rotor, the second rotor being rotatable circumferentially relative to the base, wherein a plurality of pairs of second permanent magnets may be disposed on a surface of the second rotor; a modulation ring fixed to the base coaxially with the first rotor between the first rotor and the second rotor; and a stator fixed to the base coaxially with the first rotor on a side of the second rotor opposite the first rotor, wherein a coil is arranged on the stator.

23 Claims, 5 Drawing Sheets

(56) References Cited

FOREIGN PATENT DOCUMENTS

| | | |
|---|---|---|
| CN | 103390977 A | 11/2013 |
| CN | 204391792 | 6/2015 |
| CN | 108462306 A | 8/2018 |
| GN | 101485068 | 7/2009 |

\* cited by examiner (a)

(b)

(c)

HUMAN MOTION ENERGY HARVESTING APPARATUS AND CONVERSION METHOD THEREOF

CROSS-REFERENCE TO RELATED APPLICATIONS

This application claims the benefit of priority to Chinese Patent Application No. 201910104425.X filed on Feb. 1, 2019 in the China National Intellectual Property Administration. The aforementioned patent applicant is hereby incorporated by reference in its entirety.

TECHNICAL FIELD

The present disclosure relates to a human motion energy harvesting apparatus, and more specifically to a human motion energy harvesting apparatus embeddable in a wearable electronic device. In addition, the present disclosure also relates to a human motion energy conversion method used in a wearable electronic device.

BACKGROUND

With the development of science and technology, various portable and wearable smart electronic devices such as mobile phone, smart watch, smart wristband, virtual reality glasses, or wearable health monitoring device are playing an increasingly important role in one's life and work. At present, these devices rely mainly on battery power. However, due to limitations of the existing technology, the capacity of a battery is limited, and the power required for the electronic devices is getting larger. In addition, the requirements on the miniaturization of the electronic devices are increasingly demanding, resulting in shorter battery life. At the same time, the conventional method of generating power using inertia weight usually results in bulky size. However, it is difficult to embed the inertia weight in a wearable electronic device. In addition, the conventional mechanical transmission method has the disadvantage that the transmission mechanism is easily damaged when subjected to impact force. Therefore, it is necessary and meaningful to develop a slim power supply that may be embedded in wearable electronic devices to power the electronic devices while avoiding damage to the transmission mechanism.

SUMMARY

The present disclosure proposes a human motion energy harvesting apparatus embeddable in a wearable electronic device. The apparatus has a simple structure, a small volume, and a light weight, thereby achieving slim and light weight of the battery. The human motion energy harvesting apparatus according to the present disclosure may be embedded in a wearable electronic device, and convert biomechanical energy from human motion to electric energy with human body limb swing during normal activities. The human motion energy harvesting apparatus according to the present disclosure uses a magnetic drive instead of a mechanical transmission, and thus there is no mechanical friction, thereby improving the conversion efficiency. In addition, since the magnetic drive is used instead of the mechanical transmission, the human motion energy harvesting apparatus may also prevent the transmission mechanism from being damaged by impact force caused by a sudden movement of the human limb.

In an aspect of the present disclosure, a human motion energy harvesting apparatus embeddable in a wearable electronic device is provided. The human motion energy harvesting apparatus may include a base, a first rotor, an oscillating weight, a second rotor, a modulation ring and a stator. The first rotor may be disposed in a ring shape and may be connected to the base. The first rotor is rotatable circumferentially relative to the base. A plurality of pairs of first permanent magnets may be disposed on a surface of the first rotor. The oscillating weight is fixed coaxially with the first rotor. The second rotor may be disposed in a ring shape and may be coaxially connected to the base with the first rotor. The second rotor is rotatable circumferentially relative to the base. A plurality of pairs of second permanent magnets may be disposed on a surface of the second rotor. The modulation ring may be fixed to the base coaxially with the first rotor between the first rotor and the second rotor. The stator is fixed to the base coaxially with the first rotor on a side of the second rotor opposite the first rotor. A coil may be arranged on the stator.

According to an exemplary embodiment of the present disclosure, the oscillating weight may be provided, for example, as a ring having a central angle of less than 180°.

According to an exemplary embodiment of the present disclosure, the modulation ring may comprise a plurality of magnetic conductive blocks. The magnetic conductive blocks may be arranged in a ring shape along the same circumference. The plurality of magnetic conductive blocks may be integrally formed, for example, using CNC milling, wire cutting, powder metallurgy or 3D printing.

According to an exemplary embodiment of the present disclosure, the first rotor may be a low speed rotor and the second rotor may be a high speed rotor.

According to an exemplary embodiment of the present disclosure, the plurality of magnetic conductive blocks may be fabricated, for example, in blocks, and may be filled with a hard material to enhance mechanical strength. A central axis of the plurality of magnetic conductive blocks may also be arranged obliquely relative to an axis of the base to reduce cogging torque.

According to an exemplary embodiment of the present disclosure, the oscillating weight, the first rotor, the modulation ring, the second rotor, and the stator may be arranged coaxially in an axial direction.

According to another exemplary embodiment of the present disclosure, the oscillating weight, the first rotor, the modulation ring, the second rotor, and the stator may be arranged coaxially in a radial direction.

According to an exemplary embodiment of the present disclosure, a first guide groove coaxial with the first rotor may be disposed on the first rotor, and a second guide groove coaxial with the second rotor may be disposed on the second rotor. The base may be provided with a first matching guide groove that matches with the first guide groove and a second matching guide groove that matches with the second guide groove. The first rotor may comprise a first slider such as a ball, and the first slider is arranged in a first space defined by the first guide groove and the first matching guide groove, such that the first rotor rotates circumferentially relative to the stator. The second rotor may include a second slider such as a ball, and the second slider may be arranged in a second space defined by the second guide groove and the second matching guide groove, such that the second rotor rotates circumferentially relative to the stator.

According to an exemplary embodiment of the present disclosure, the first slider and the second slider may be made of a low friction material such as ceramic.

According to another exemplary embodiment of the present disclosure, a first guide groove coaxial with the first rotor may be disposed on the first rotor, and a second guide groove coaxial with the second rotor may be disposed on the second rotor. The human motion energy harvesting apparatus may further comprise a first stationary ring and a second stationary ring. The first stationary ring may be fixed to the base and may be provided with a first matching guide groove that matches with the first guide groove. The first rotor may rotate circumferentially relative to the base via the first stationary ring. The second stationary ring may be fixed to the base and may be provided with a second matching guide groove that matches with the second guide groove. The second rotor may rotate circumferentially relative to the base via the second stationary ring.

According to an exemplary embodiment of the present disclosure, the first rotor may comprise a first slider such as a ball. The first slider may be arranged in a first space defined by the first guide groove and the first matching guide groove, such that the first rotor rotates circumferentially relative to the stator. The second rotor may include a second slider such as a ball. The second slider may be arranged in a second space defined by the second guide groove and the second matching guide groove, such that the second rotor rotates circumferentially relative to the stator.

According to an exemplary embodiment of the present disclosure, the second permanent magnets may be arranged as a single row of permanent magnets or as double-row permanent magnets.

When the second permanent magnets are arranged as a single row of permanent magnets, the number of pairs of the single row of permanent magnets is less than the number of pairs of the first permanent magnets. When the second permanent magnets are arranged as double-row permanent magnets, a magnetic field shielding ring is disposed between a first row of permanent magnets of the double-row permanent magnets and a second row of permanent magnets of the double-row permanent magnets, and the first row of permanent magnets matches with the second rotor. The number of pairs of the first row of permanent magnets is less than the number of pairs of the first permanent magnets.

According to an exemplary embodiment of the present disclosure, the first row of permanent magnets may, for example, be arranged to be magnetized in a radial direction, and the second row of permanent magnets may, for example, be arranged to be magnetized in an axial direction.

According to another exemplary embodiment of the present disclosure, the first row of permanent magnets and the second row of permanent magnets may, for example, be arranged to be magnetized in a radial direction.

According to an exemplary embodiment of the present disclosure, for example, a slot may be provided on the stator, and the coil may be wound in the slot.

According to another exemplary embodiment of the present disclosure, the coil may be disposed, for example, on the stator by a printed circuit.

According to an aspect of the present disclosure, a human motion energy conversion method for a wearable electronic device is provided. The method may include: acquiring a first motion energy applied to the electronic device; generating a low frequency magnetic field using the motion energy; performing high frequency modulation on the low frequency magnetic field to generate a high frequency magnetic field; acquiring a second motion energy using the high frequency magnetic field; and generating an induced current using the second motion energy. The generated induced current may be stored in the battery of a variety of portable, wearable smart electronic devices or directly power the smart electronic devices.

According to an exemplary embodiment of the present disclosure, when a limb wearing the electronic device swings, the mechanical energy of the limb swing is acquired by the oscillating weight. The oscillating weight drives the low speed rotor to rotate, thereby converting the mechanical energy of the limb swing into energy of a low frequency magnetic field using the permanent magnets on the low speed rotor. The generated low frequency magnetic field is modulated by the modulation ring by performing high frequency modulation to generate a high frequency magnetic field. The high frequency magnetic field drives the permanent magnets on the high speed rotor to rotate, thereby driving the high speed rotor to rotate. The rotation of the permanent magnets on the high speed rotor causes a variation in the magnetic flux of the winding coil on the stator, thereby converting the mechanical energy produced by the swing of the human body limb into electrical energy.

According to an aspect of the present disclosure, a wearable electronic device including a human motion energy harvesting apparatus according to an exemplary embodiment of the present disclosure, and a portable electronic device are provided. The wearable electronic device may be, for example, a smart wristband, smart glasses, a smart watch, a wearable health monitoring device, or the like. The portable electronic device may be, for example, a mobile phone, a tablet, a personal digital assistant, or the like.

BRIEF DESCRIPTION OF THE DRAWINGS

The principles of the inventive concept are illustrated below by describing non-limiting embodiments of the present disclosure in conjunction with the accompanying drawings. It should be understood that the drawings are intended to illustrate, rather than limit the exemplary embodiments of the present disclosure. The accompanying drawings are included to provide a further understanding of the general concept of the present disclosure, and are incorporated in the specification to constitute a part thereof. The same reference numerals in the drawings denote the same features. In the accompanying drawings.

DETAILED DESCRIPTION OF EMBODIMENTS

Figure 1:
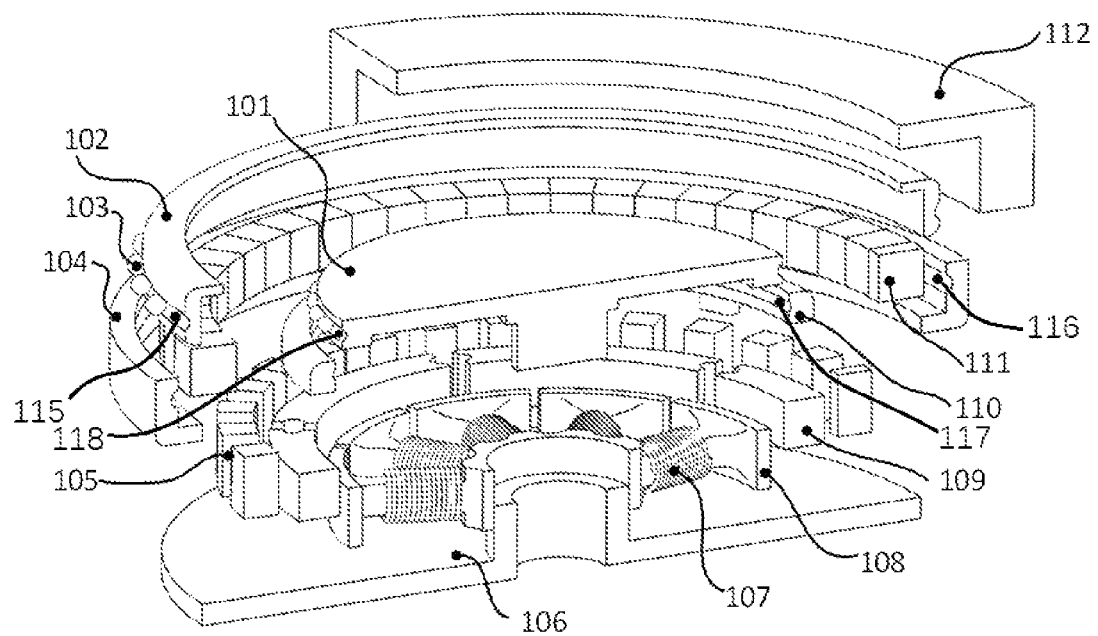
FIG. 1 is a schematic cross-sectional diagram showing an exploded structure of a human motion energy harvesting apparatus according to an exemplary embodiment of the present disclosure.

For a better understanding of the present disclosure, various aspects of the present disclosure will be described in more detail with reference to the exemplary embodiments illustrated in the accompanying drawings. It should be understood that the detailed description is merely an illustration of the exemplary embodiments of the present disclosure rather than a limitation to the scope of the present disclosure in any way. Throughout the specification, the identical reference numerals designate the same elements. The expression "and/or" includes any and all combinations of one or more of the associated listed items.

It should be noted that in the description and the claims, the expressions, such as "first," and "second" are only used to distinguish one feature from another, rather than represent any limitations to the features. Thus, the first rotor, the first guide groove discussed herein may also be referred to as the second rotor, the second guide groove, and vice versa, without departing from the teachings of the present disclosure.

In the accompanying drawings, the thicknesses, sizes and shapes of the components have been slightly exaggerated for the convenience of explanation. The accompanying drawings are merely illustrative and not strictly drawn to scale.

It should be understood that the terms "comprising," "including," "having" and variants thereof, when used in the specification, specify the presence of stated features, elements, components and/or steps, but do not exclude the presence or addition of one or more other features, elements, components, steps and/or combinations thereof. In addition, expressions, such as "at least one of," when preceding a list of listed features, modify the entire list of features rather than an individual element in the list. Further, the use of "may," when describing the embodiments of the present disclosure, relates to "one or more embodiments of the present disclosure." Also, the term "exemplary" is intended to refer to an example or illustration of the embodiment.

Unless otherwise defined, all terms (including technical and scientific terms) used herein have the same meaning as commonly understood by those skilled in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless explicitly so defined herein.

The portable or wearable electronic devices to which the present disclosure relates may include, but are not limited to, mobile phones, tablets, personal digital assistants, smart wristbands, smart glasses, smart watches, wearable health monitoring devices, or the like.

The various aspects of the present disclosure are described in more detail below with reference to the accompanying drawings and in conjunction with specific embodiments, but the embodiments of the present disclosure are not limited thereto.

As shown in FIG. 1, a human motion energy harvesting apparatus embeddable in a wearable electronic device 10 may include a fixed base 106, a low speed rotor 102 and a high speed rotor 110 connected to the base 106 and rotatable circumferentially about the base 106, and a stator 108 fixed to the base 106 on the side of the high speed rotor 110 opposite the low speed rotor 102. The stator 108 is fixed to the base 106, thus the low speed rotor 102 and the high speed rotor 110 are rotatable circumferentially relative to the stator 108.

An oscillating weight 112 is fixedly coupled to the low speed rotor 102 to drive the rotor 102 to rotate relative to the stator 108 as it swings back and forth due to gravity.

The oscillating weight 112 may be designed, for example, as a ring having a central angle of less than 180°, but it should be understood that the oscillating weight may also be designed to other shapes capable of driving the low speed rotor 102 to rotate. In order to increase the moment of inertia, the oscillating weight 112 may be fabricated with a high density material such as a tungsten alloy, or a gold alloy. In an exemplary embodiment, the oscillating weight 112 is fixed to the low speed rotor 102 and is coaxial to the low speed rotor 102. The oscillating weight 112 may also be integrally formed with the low speed rotor 102.

The low speed rotor 102 may be designed in a ring shape, the inner surface of the low speed rotor 102 may be attached with many pairs of permanent magnets 111, and the outer surface of the low speed rotor 102 may be provided with a smooth guide groove 115. The low speed rotor 102 may also serve as a rotating ring for a low speed bearing and is matched coaxially with a low speed bearing stationary ring 104 having a smooth guide groove 116. The low speed bearing stationary ring 104 is fixed to the base 106. A movable slider 103, such as a ball 103, rolls in a space defined by the smooth guide groove of the low speed rotor 102 and the smooth guide groove of the low speed bearing stationary ring 104 to reduce mechanical friction.

The high speed rotor 110 may be designed, for example, in a ring shape, and the surface of the high speed rotor 110 may be attached with a plurality of permanent magnets 109. The permanent magnets 109 may be arranged as a single row of permanent magnets or as double-row permanent magnets. When the permanent magnets of the high speed rotor 110 are arranged only in a single row, the number of pairs of the row of permanent magnets of the high speed rotor 110 is less than that of the permanent magnets of the low speed rotor 102, which may simultaneously serve as a transmission mechanism coupled to the low speed rotor 102 and an electromechanical conversion mechanism coupled to the stator 108. When the permanent magnets 109 of the high speed rotor 110 are arranged in double-row, the number of pairs of the row of permanent magnets coupled to the low speed rotor 102 is less than the number of permanent magnets of the low speed rotor 102, and the other row of permanent magnets has several pairs. The two rows of permanent magnets are separated by a magnetic field shielding material.

The permanent magnets 109 and the permanent magnets 111 may be made of, for example, a rare earth permanent magnet material (NeodymiumNd2Fe14B), samarium cobalt (SmCo), AlNiCo or a ferrite permanent magnet material and so on, but the present disclosure is not limited thereto.

A modulation ring 105 is provided between the low speed rotor 102 and the high speed rotor 110. The modulation ring 105 may be formed, for example, by a plurality of magnetic conductive blocks uniformly distributed on the same circumference, thereby being fixed to the base 106 in a ring shape between the low speed rotor 102 and the high speed rotor 110 for modulating a magnetic field. The magnetic conductive blocks of the modulation ring 105 may be fabricated integrally or in blocks, for example, using CNC milling, wire cutting, powder metallurgy or 3D printing. The magnetic conductive blocks may be made of, for example, a material such as pure iron, steel (1005), steel (1006), steel (1008), silicon steel (hot-rolled), silicon steel (cold-rolled grain orientation), permalloy (A753 Alloy), supermalloy, superconducting alloy, or superconducting compound. The magnetic conductive blocks of the modulation ring 105 may be filled with a hard material to enhance mechanical strength, or the central axis of the magnetic conductive blocks may be arranged obliquely at an angle relative to the axis of the base to reduce cogging torque.

According to an exemplary embodiment of the present application, the oscillating weight 112, the low speed rotor 102, the modulation ring 105, the high speed rotor 110, and the stator 108 are coaxially disposed on the base 106.

Figure 2A:
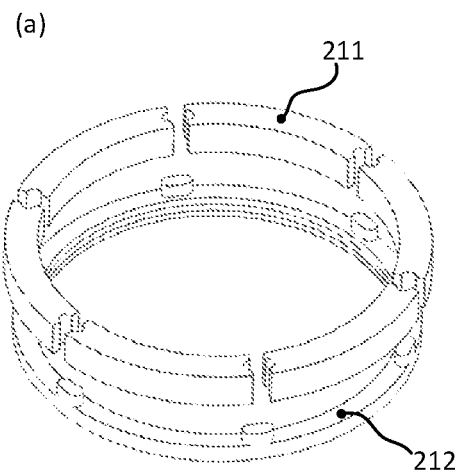
FIGS. 2A to 2C are schematic diagrams showing arrangements of permanent magnets of the human motion energy harvesting apparatus on a high speed rotor according to exemplary embodiments of the present disclosure.
Figure 2B:
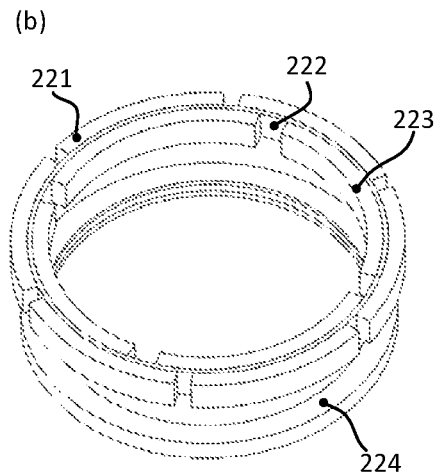
Figure 2C:
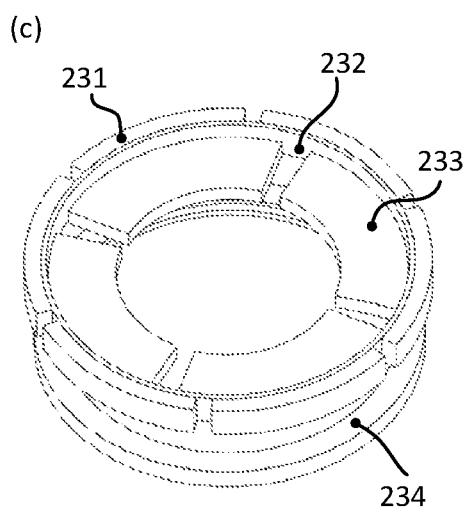

FIGS. 2A to 2C are schematic diagrams showing arrangements of permanent magnets of the human motion energy harvesting apparatus on a high speed rotor according to exemplary embodiments of the present disclosure. Specifically, FIG. 2A illustrates a single row permanent magnet arrangement on a high speed rotor applicable to the human motion energy harvesting apparatus of the present disclosure. As shown in FIG. 2A, permanent magnets 211 arranged in single row is mounted on a high speed rotor 212, which also serves as a transmission mechanism coupled to a low speed rotor and an electromechanical conversion mechanism coupled to a stator. FIG. 2B illustrates a double-row permanent magnet arrangement on a high speed rotor applicable to the human motion energy harvesting apparatus of the present disclosure. As shown in FIG. 2B, a first row of permanent magnets 221, a magnetic field shielding ring 222, and a second row of permanent magnets 223 are mounted on a high speed rotor 224. Both the first row of permanent magnets 221 and the second row of permanent magnets 223 are magnetized in the radial direction. The first row of permanent magnets 211 may serve as a transmission mechanism coupled to a low speed rotor, while the second row of permanent magnets 233 may serve as an electromechanical conversion mechanism coupled to a stator. FIG. 2C illustrates another double-row permanent magnet arrangement on a high speed rotor applicable to the human motion energy harvesting apparatus of the present disclosure. As shown in FIG. 2C, a first row of permanent magnets 231, a magnetic field shielding ring 232, and a second row of permanent magnets 233 are mounted on a high speed rotor 234. Different from FIG. 2B, the second row of permanent magnets 233 is magnetized in the axial direction.

The other surface of the high speed rotor 110 may be provided with a smooth guide groove 117. In the exemplary embodiment shown in FIG. 1, the high speed rotor 110 may simultaneously serve as a rotating ring for a high speed bearing that is coaxially coupled to a high speed bearing stationary ring 101 having a smooth guide groove 118. The high speed bearing stationary ring 101 is fixed to the base 106, and a ball 119 may be disposed in a space defined by the smooth guide groove 117 of the high speed rotor 110 and the smooth guide groove 118 of the high speed bearing stationary ring 101 to cause the ball 119 to roll therebetween, thereby reducing mechanical friction.

The transmission mechanism composed of the low speed rotor 102, the modulation ring 105, and the high speed rotor 110 may be regarded as a single stage acceleration transmission mechanism. Those skilled in the art should understand that the mechanism may also be designed as a multi-stage acceleration transmission mechanism based on the same principle according to the requirements of a specific application, thereby further increasing the acceleration ratio.

The stator 108 is fixedly mounted on the base 106 and is provided with a coil 107. In an exemplary embodiment, for example, the stator may be configured to have a slot structure to facilitate winding the coil in the slot of the stator. In an alternative embodiment, the stator may also be arranged without a slot structure, and the coil may be fabricated and fixed to the stator, for example by a printed circuit or a self-adhesive coil.

It should be understood that the above components may be mounted coaxially in the radial or axial direction as desired for different applications. The permanent magnets may be magnetized in the radial or axial direction depending on the arrangement of the apparatus.

The oscillating weight, the low speed rotor, the modulation ring, the high speed rotor, and the stator are specifically described above by way of the exemplary embodiments. Next, the human motion energy harvesting apparatus according to the present disclosure will be described as a whole.

Figure 3:
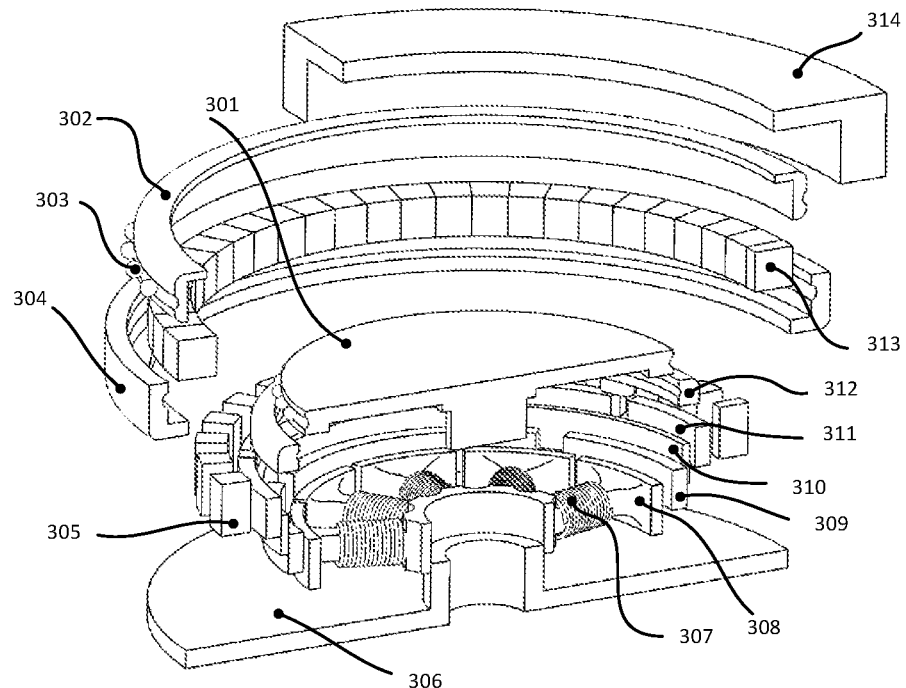
FIG. 3 is a schematic cross-sectional diagram showing an exploded structure of a human motion energy harvesting apparatus according to another exemplary embodiment of the present disclosure.

FIG. 3 is a schematic cross-sectional diagram showing an exploded structure of a human motion energy harvesting apparatus 30 according to another exemplary embodiment of the present disclosure. In this embodiment, a first row of permanent magnets 309 and a second row of permanent magnets 311 are disposed on a high speed rotor 312. The two rows of permanent magnets 309 and 311 and a magnetic field shielding ring 310 are fixed to the high speed rotor 312. The first row of permanent magnets 309 serves as a transmission mechanism coupled to a low speed rotor 302, and the second row of permanent magnets 311 serves as an electromechanical conversion mechanism coupled to a stator 308. As shown in FIG. 3, an oscillating weight 314, the low speed rotor 302, a modulation ring 305, the high speed rotor 312, and the stator 308 are arranged coaxially in the radial direction. The stator 308 of this exemplary embodiment may have a slot structure. A coil 307 may be wound in the slot structure. Since the components are arranged coaxially in the radial direction, the thickness of the entire human motion energy harvesting apparatus 30 is small. Further, in this embodiment, since the components are arranged in the radial direction, the axial dimension may be made small, thereby realizing the slimness of the human motion energy harvesting apparatus 30 in the axial direction. The human motion energy harvesting apparatus 30 according to this embodiment is, for example, adapted to be embedded in a flat wearable electronic device.

Figure 4:
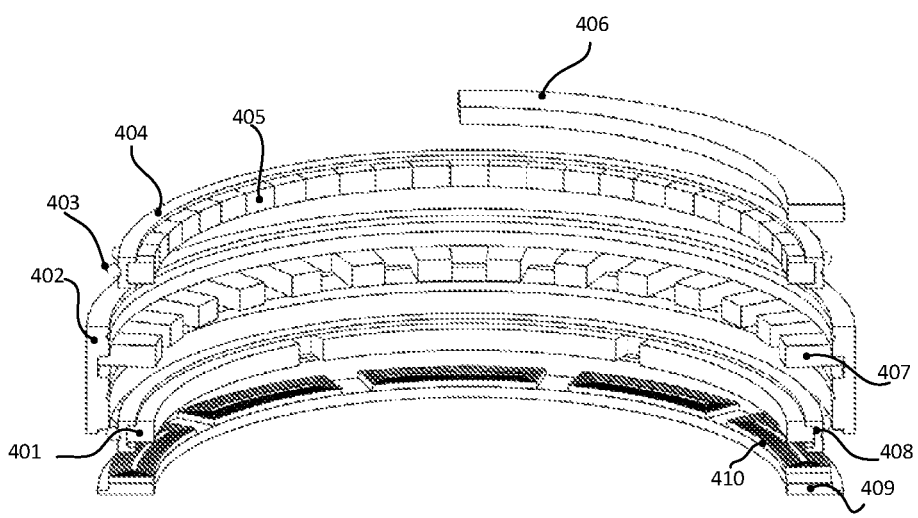
FIG. 4 is a schematic cross-sectional diagram showing an exploded structure of a human motion energy harvesting apparatus according to further another exemplary embodiment of the present disclosure.

FIG. 4 is a schematic cross-sectional diagram showing an exploded structure of a human motion energy harvesting apparatus 40 according to further another exemplary embodiment of the present disclosure. The components comprised in the human motion energy harvesting apparatus 40 shown in FIG. 4 is arranged coaxially in the axial direction. Specifically, an oscillating weight 406, a low speed rotor 404, a modulation ring 407, a high speed rotor 408, and a stator 409 are sequentially mounted coaxially in the axial direction. In this example, a single row of permanent magnets 401 is arranged on the high speed rotor 408. The stator 409 may employ a structure without slot. A coil 410 may be mounted on the stator 409, for example, using a printed circuit. In this embodiment, since the components are arranged in the axial direction, the thickness of the entire apparatus in the radial direction is small, thereby realizing the slimness of the human motion energy harvesting apparatus 40 in the radial direction. The human motion energy harvesting apparatus 40 according to this embodiment is, for example, adapted to be embedded in a wearable electronic device having a ring shape.

Figure 5:
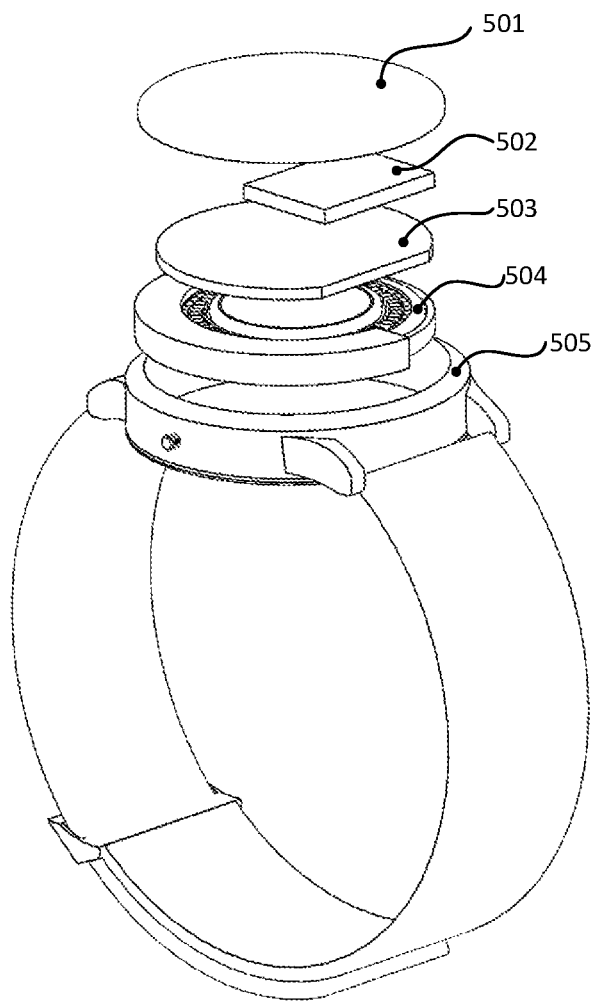
FIG. 5 is a schematic diagram showing a human motion energy harvesting apparatus embedded in a smart watch according to an exemplary embodiment of the present disclosure.

FIG. 5 is a schematic diagram showing a human motion energy harvesting apparatus 504 embedded in a smart watch 500 according to an exemplary embodiment of the present disclosure. As shown in FIG. 5, the human motion energy harvesting apparatus 504 according to an exemplary embodiment of the present disclosure is coaxially arranged in the radial direction and embedded in an outer casing 505 of the smart watch 500. Since the smart watch 500 typically requires a relatively small axial thickness, the human motion energy harvesting apparatus 504 according to the present disclosure may adopt a radial arrangement to meet the requirements of this application. For example, the human motion energy harvesting apparatus 504 may adopt the embodiment shown in FIG. 3.

The operation mode of the human motion energy harvesting apparatus will now be described in detail in combination with the embodiment shown in FIG. 3.

Since one swings arm from time to time during normal activities, the arm and the oscillating weight 314 form a double pendulum structure. Driven by the inertial force, the oscillating weight 314 rotates about the axis of the base 306 while driving the low speed rotor 302 connected thereto to rotate. An array of permanent magnets 313 fixed to the surface of the low speed rotor 302 modulates a high frequency magnetic field under the action of the modulation ring 305 as the low speed rotor 302 rotates, thereby driving the high speed rotor 312 having the permanent magnet 311 fixed thereon to rotate. Since the number of the pairs of the permanent magnets 313 on the low speed rotor 302 is larger than the number of the pairs of the permanent magnets 311 on the surface of the high speed rotor 312, the rotation of the high speed rotor 312 is accelerated, thereby obtaining a higher rotating speed. When rotating, the permanent magnets 309 on the high speed rotor 312 simultaneously cause a variation in the magnetic flux of the winding coil 307 on the stator 308, thereby converting the mechanical energy produced by the human body limb swing into electrical energy. The generated electrical energy is rectified and regulated by a circuit 503 connected to the smart watch circuit, and may be directly supplied to an application 501 of the smart watch 500 or stored in a battery 502.

Figure 6:
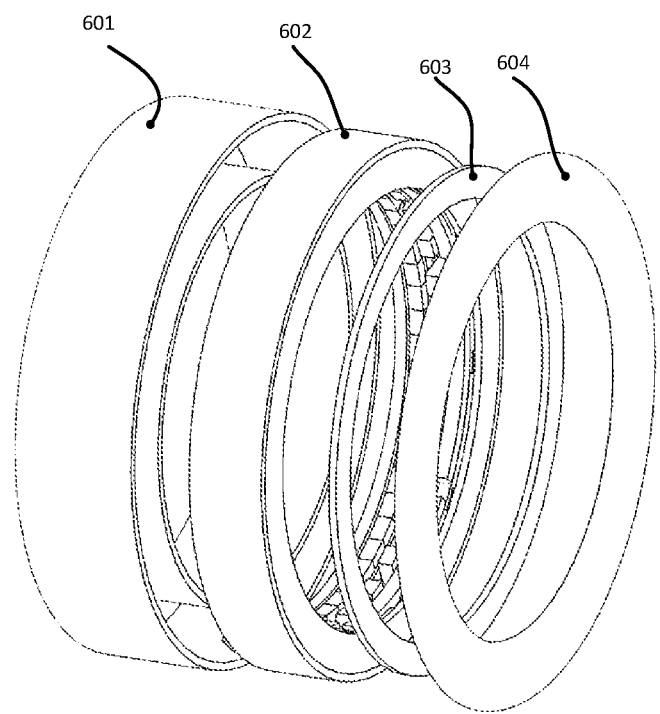
FIG. 6 is a schematic diagram showing a human motion energy harvesting apparatus embedded in a smart wristband according to an exemplary embodiment of the present disclosure.

FIG. 6 is a schematic diagram showing a human motion energy harvesting apparatus 602 embedded in a smart wristband 600 according to an exemplary embodiment of the present disclosure. As shown in FIG. 6, the human motion energy harvesting apparatus 602 according to an exemplary embodiment of the present disclosure is coaxially arranged in the axial direction and embedded in an outer casing 601 of the smart wristband 600. Since the smart wristband 600 typically requires a relatively small radial thickness, the human motion energy harvesting apparatus 602 may adopt an axial arrangement to meet the radial ultra-slim requirements of this application. For example, a human motion energy harvesting apparatus for the smart wristband 600 may adopt the embodiment shown in FIG. 4.

The operation mode of the human motion energy harvesting apparatus for the smart wristband 600 will now be described in detail in combination with the embodiment shown in FIG. 4.

When swinging the arm, the oscillating weight 406 of the human motion energy harvesting apparatus 40 rotates about the axis of a base 402 driven by the inertial force, and the low speed rotor 404 connected thereto is driven to rotate. When an array of permanent magnets 405 fixed to the surface of the low speed rotor 404 rotates, a high frequency magnetic field is modulated under the action of the modulation ring 407, thereby driving the high speed rotor 408 having the permanent magnets 401 fixed thereon to rotate. Since the number of the pairs of the permanent magnets 405 on the low speed rotor 404 is larger than the number of the permanent magnets 401 on the surface of the high speed rotor 408, the rotation of the high speed rotor 408 is accelerated, thereby obtaining a higher rotating speed. When rotating, the permanent magnets 401 on the high speed rotor 408 cause a variation in the magnetic flux of the winding coil 410 on the stator 409, thereby converting the mechanical energy produced by the swing of the human body limb into electrical energy. The generated electrical energy is inserted into a circuit 603 of the smart wristband, and after being rectified and regulated, may be directly supplied to an application 604 of the smart wristband 600 or stored in a battery (not shown).

Thus, the human motion energy harvesting apparatus embeddable in a smart wearable electronic device according to the present disclosure may generate electric energy for directly supplying power to the application of a smart electronic device or stored in the battery by the following steps: when a limb wearing the electronic device swings, acquiring mechanical energy of the limb swing by the oscillating weight; driving the low speed rotor to rotate by the oscillating weight, so that the permanent magnets on the low speed rotor convert the mechanical energy produced by limb swing into a first induced magnetic field; performing high frequency modulation on the generated first induced magnetic field to generate a high frequency magnetic field using the modulation ring; driving the permanent magnets on the high speed rotor to rotate by the high frequency magnetic field, thereby driving the high speed rotor to rotate; and causing a variation in the magnetic flux of the winding coil on the stator by the rotation of the permanent magnets on the high speed rotor, thereby converting the mechanical energy produced by the swing of the human body limb into electrical energy.

The exemplary embodiments of the present disclosure have been described above with reference to the accompanying drawings. Those skilled in the art should understand that the above embodiments are merely examples for the purpose of illustration, and are not intended to limit the scope of the disclosure. The scope of the present disclosure should be limited by the appended claims and their equivalents. Any modifications, equivalent replacements, etc. made within the scope of the teachings and claims of the present disclosure are intended to be included within the scope of the present disclosure.

What is claimed is:

1. A human motion energy harvesting apparatus embeddable in a wearable electronic device, comprising:
   a base;
   a first rotor, disposed in a ring shape and connected to the base, the first rotor being rotatable circumferentially relative to the base, wherein a plurality of pairs of first permanent magnets are disposed on a surface of the first rotor;
   an oscillating weight, fixed coaxially with the first rotor;
   a second rotor, disposed in a ring shape and coaxially connected to the base with the first rotor, the second rotor being rotatable circumferentially relative to the base, wherein a plurality of pairs of second permanent magnets are disposed on a surface of the second rotor;
   a modulation ring, fixed to the base coaxially with the first rotor between the first rotor and the second rotor; and
   a stator, fixed to the base coaxially with the first rotor on a side of the second rotor opposite the first rotor, wherein a coil is arranged on the stator.

2. The human motion energy harvesting apparatus according to claim 1, wherein,
   the oscillating weight is a ring having a central angle of less than 180°.

3. The human motion energy harvesting apparatus according to claim 2, wherein,
the modulation ring comprises a plurality of magnetic conductive blocks arranged in a ring shape along a same circumference.

4. The human motion energy harvesting apparatus according to claim 3, wherein,
the plurality of magnetic conductive blocks are integrally formed by one selected from a group consisting of CNC milling, wire cutting, powder metallurgy and 3D printing.

5. The human motion energy harvesting apparatus according to claim 4, wherein,
the first rotor is a low speed rotor and the second rotor is a high speed rotor.

6. The human motion energy harvesting apparatus according to claim 5, wherein,
the oscillating weight, the first rotor, the modulation ring, the second rotor, and the stator are arranged coaxially in an axial direction.

7. The human motion energy harvesting apparatus according to claim 6, wherein,
a first guide groove coaxial with the first rotor is formed on the first rotor, and a second guide groove coaxial with the second rotor is formed on the second rotor;
the base is provided with a first matching guide groove that matches with the first guide groove and a second matching guide groove that matches with the second guide groove;
the first rotor comprises a first slider arranged in a first space defined by the first guide groove and the first matching guide groove, such that the first rotor rotates circumferentially relative to the stator; and
the second rotor comprises a second slider arranged in a second space defined by the second guide groove and the second matching guide groove, such that the second rotor rotates circumferentially relative to the stator.

8. The human motion energy harvesting apparatus according to claim 7, wherein,
the first slider and the second slider comprise balls; and
the first slider and the second slider are made of a low friction material.

9. The human motion energy harvesting apparatus according to claim 5, wherein,
the oscillating weight, the first rotor, the modulation ring, the second rotor, and the stator are arranged coaxially in a radial direction.

10. The human motion energy harvesting apparatus according to claim 9, wherein,
a first guide groove coaxial with the first rotor is disposed on the first rotor, and a second guide groove coaxial with the second rotor is disposed on the second rotor, and wherein,
the human motion energy harvesting apparatus further comprises:
a first stationary ring, fixed to the base and provided with a first matching guide groove that matches with the first guide groove, the first rotor rotates circumferentially relative to the base via the first stationary ring; and
a second stationary ring, fixed to the base and provided with a second matching guide groove that matches with the second guide groove, the second rotor rotates circumferentially relative to the base via the second stationary ring.

11. The human motion energy harvesting apparatus according to claim 10, wherein,
the first rotor comprises a first slider arranged in a first space defined by the first guide groove and the first matching guide groove, such that the first rotor rotates circumferentially relative to the stator; and
the second rotor comprises a second slider arranged in a second space defined by the second guide groove and the second matching guide groove, such that the second rotor rotates circumferentially relative to the stator.

12. The human motion energy harvesting apparatus according to claim 11, wherein,
the first slider and the second slider comprise balls; and
the first slider and the second slider are made of a low friction material.

13. The human motion energy harvesting apparatus according to claim 4, wherein,
the plurality of magnetic conductive blocks are fabricated in blocks and filled with a hard material to enhance mechanical strength.

14. The human motion energy harvesting apparatus according to claim 4, wherein,
a central axis of each of the magnetic conductive blocks is arranged obliquely relative to an axis of the base to reduce cogging torque.

15. The human motion energy harvesting apparatus according to claim 4, wherein,
the second permanent magnets are arranged as a single row of permanent magnets, and a number of pairs of the single row of permanent magnets is less than a number of pairs of the first permanent magnets.

16. The human motion energy harvesting apparatus according to claim 4, wherein,
the second permanent magnets are arranged as double-row permanent magnets, and a magnetic field shielding ring is disposed between a first row of permanent magnets of the double-row permanent magnets and a second row of permanent magnets of the double-row permanent magnets; and
the first row of permanent magnets matches with the second rotor, and a number of pairs of the first row of permanent magnets is less than a number of pairs of the first permanent magnets.

17. The human motion energy harvesting apparatus according to claim 16, wherein,
the first row of permanent magnets is arranged to be magnetized in a radial direction, and the second row of permanent magnets is arranged to be magnetized in an axial direction.

18. The human motion energy harvesting apparatus according to claim 16, wherein,
the first row of permanent magnets and the second row of permanent magnets are arranged to be magnetized in a radial direction.

19. The human motion energy harvesting apparatus according to claim 1, wherein,
a slot is provided on the stator, and the coil is wound in the slot.

20. The human motion energy harvesting apparatus according to claim 1, wherein,
the coil is disposed on the stator by a printed circuit.

21. A human motion energy conversion method for a wearable electronic device, comprising:
acquiring a first motion energy applied to the electronic device;
generating a low frequency magnetic field using the motion energy;

performing high frequency modulation on the low frequency magnetic field to generate a high frequency magnetic field;

acquiring a second motion energy by the high frequency magnetic field; and generating an induced current by the second motion energy.

22. A wearable electronic device, comprising a human motion energy harvesting apparatus, wherein the human motion energy harvesting apparatus comprises:

a base;

a first rotor, disposed in a ring shape and connected to the base, the first rotor being rotatable circumferentially relative to the base, wherein a plurality of pairs of first permanent magnets are disposed on a surface of the first rotor;

an oscillating weight, fixed coaxially with the first rotor;

a second rotor, disposed in a ring shape and coaxially connected to the base with the first rotor, the second rotor being rotatable circumferentially relative to the base, wherein a plurality of pairs of second permanent magnets are disposed on a surface of the second rotor;

a modulation ring, fixed to the base coaxially with the first rotor between the first rotor and the second rotor; and a stator, fixed to the base coaxially with the first rotor on a side of the second rotor opposite the first rotor, wherein a coil is arranged on the stator, wherein the oscillating weight, the first rotor, the modulation ring, the second rotor, and the stator are arranged coaxially in an axial direction.

23. A wearable electronic device, comprising a human motion energy harvesting apparatus, wherein the human motion energy harvesting apparatus comprises:

a base;

a first rotor, disposed in a ring shape and connected to the base, the first rotor being rotatable circumferentially relative to the base, wherein a plurality of pairs of first permanent magnets are disposed on a surface of the first rotor;

an oscillating weight, fixed coaxially with the first rotor;

a second rotor, disposed in a ring shape and coaxially connected to the base with the first rotor, the second rotor being rotatable circumferentially relative to the base, wherein a plurality of pairs of second permanent magnets are disposed on a surface of the second rotor;

a modulation ring, fixed to the base coaxially with the first rotor between the first rotor and the second rotor; and a stator, fixed to the base coaxially with the first rotor on a side of the second rotor opposite the first rotor, wherein a coil is arranged on the stator, wherein the oscillating weight, the first rotor, the modulation ring, the second rotor, and the stator are arranged coaxially in a radial direction.

* * * * *